No. 817,875. PATENTED APR. 17, 1906.
C. SCHALLINGER & M. SONDERGAARD.
AERATING DEVICE FOR PASTEURIZING.
APPLICATION FILED APR. 28, 1903.
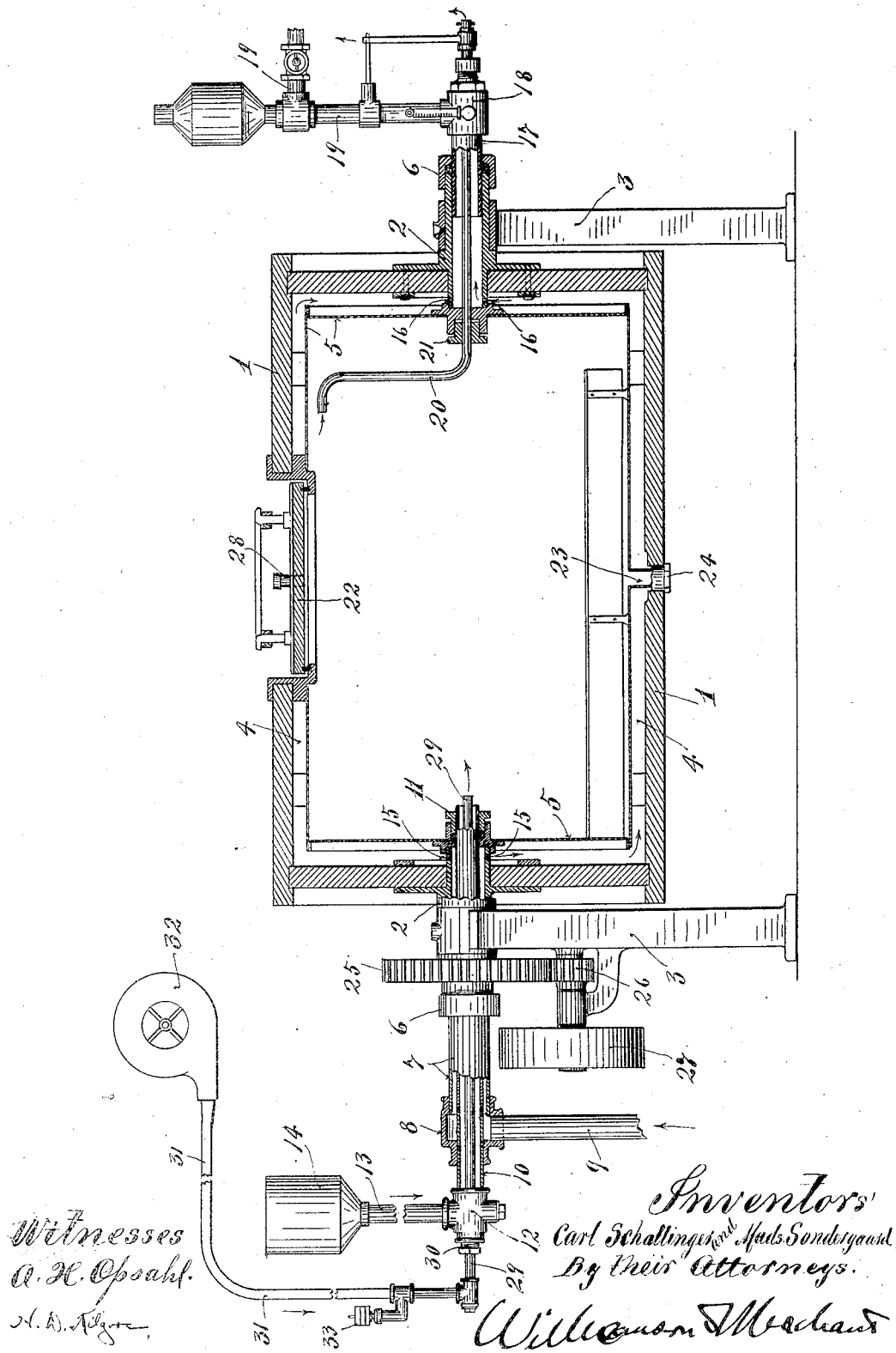
Witnesses
O. H. Opsahl.
N. A. Kilgore.
Inventors
Carl Schallinger and Mads Sondergaard
By their Attorneys
Williamson & Merchant

UNITED STATES PATENT OFFICE.

CARL SCHALLINGER AND MADS SONDERGAARD, OF HUTCHINSON, MINNESOTA.

AERATING DEVICE FOR PASTEURIZING.

No. 817,875.     Specification of Letters Patent.     Patented April 17, 1906.

Application filed April 28, 1903. Serial No. 154,622.

*To all whom it may concern:*

Be it known that we, CARL SCHALLINGER and MADS SONDERGAARD, citizens of the United States, residing at Hutchinson, in the county of McLeod and State of Minnesota, have invented certain new and useful Improvements in Aerating Devices for Pasteurizing; and we do hereby declare the following to be a full, clear, and exact description of the invention, such as will enable others skilled in the art to which it appertains to make and use the same.

Our invention relates particularly to the improvement of so-called "pasteurizers," "sterilizers," "coolers," and similar apparatus wherein the liquid to be tempered is placed in a rotary drum or receptacle, and the invention is especially directed to the provision of improved means for aerating such liquid while it is being tempered within the drum or receptacle.

To the above ends the invention consists of the novel devices and combinations of devices hereinafter described, and defined in the claims.
In the accompanying drawing, wherein like characters indicate like parts, our invention is illustrated as applied to the type of apparatus just identified.

The said apparatus, with our invention applied thereto, is illustrated in the single view of the drawing.

The numeral 1 indicates a large horizontally-disposed drum or tank provided at its end with heavy hollow trunnions or sleeve-like journals 2, that are mounted in the upper ends of heavy standards 3. Rigidly secured within the drum 1, but spaced apart therefrom to form a chamber 4, is an inner drum 5, which affords a tempering-receptacle for the cream or other liquid to be tempered. One of the trunnions 2 is connected by a packed journal-joint 6 to a water-supply pipe 7, which is fixed against rotation and is provided at its outer end with a T-head 8, which is tapped by a depending water-supply pipe 9. A cream-supply tube 10 of considerably smaller diameter than the pipe 7 telescopes with the tight joint through the T-head 8, through the pipe 7 and connected trunnion 2, and terminates within the inner drum 5. The stuffing-box 11 forms a tight joint between the inner end of the tube 10 and the hub portion of the said inner drum 5. The cream-delivery tube 10 is provided at its outer end with the T-head 12, into which opens a vertical tube 13, having at its upper end a funnel or expanded receptacle 14. The water or tempering liquid delivered through the pipe 9 into the pipe 7 and connected hollow trunnion 2 passes into the chamber 4, through perforations 15 in the said trunnion, and between the adjacent heads of the two drums 1 and 5. The trunnion 2 at the other end of the drum 1 is provided with a perforation 16, which affords outlet-passages for the tempering liquid from the chamber 4 into this latter-noted trunnion and from thence into a non-rotary sleeve 17, having at its outer end a T-head 18, from which rises an overflow-pipe 19. An air-venting pipe 20, which is held against rotation, extends axially through the T-head 18, sleeve 17, and connected trunnion 2. A stuffing-box 21 forms a tight joint between the vent-pipe 20 and the hub of the inner drum 5. The inner end of the vent-pipe 20 is bent upward and terminates near the upper portion of the chamber formed within the drum 5.

The numeral 22 indicates a cover which normally closes a large passage which opens through one side of both of the drums 1 and 5.

The numeral 23 indicates a discharge-tube which leads outward from the inner drum 5, through the adjacent side of the drum, and is normally closed by a suitable plug or cap 24.

Rigidly secured on the projecting end of one of the trunnions 2 is a spur-gear 25, that meshes with a spur-pinion 26, suitably mounted in the adjacent standard 3 and connected on the same shaft with a pulley 27. Rotary motion is imparted to the drum by a power-driven belt (not shown) which runs over the pulley 27.

The cream deposited in the funnel 14 is allowed to run through the pipes 13 and 10 into the tempering-chamber within the inner drum 5 until the said chamber is nearly, but not quite filled. The displacement of the air from the said pasteurizing-chamber is permitted by the vent-pipe 20. The tempering liquid—hot water, for example—is by a pump or other suitable means caused to flow inward through the pipe 9, sleeve 7, connected trunnion 2, and perforations 15 into the chamber 4, formed between the two connected drums 1 and 5, and from thence to flow outward through the perforations 16, the right-hand trunnion 2, sleeve 17, and the overflow-pipe 19. This so-called "tempering" liquid would be relatively warm or cold, according to whether the apparatus is used as a pasteurizer or as a cooler. The ripened or properly tempered milk, cream, or other liquid is removed from the tempering-chamber when the drum stands as indicated in the drawing through the discharge-tube 23, the plug or valve 24 of which is of course removed at such time. If the churn or receptacle into which the cream or tempered liquid is to be discharged be located below the drum, the liquid would run out of the drum under the action of gravity alone, but if located above the tank the liquid must be forced out under pressure. This has been accomplished by closing up the cream-inlet and also the air-vent 20 and forcing air into the drum under pressure. The said apparatus has usually been provided with a tube 28 in its cover 22, to which an air-tube from an air-compressor or storage-tank has been applied to force out the cream, as just stated.

With the apparatus so far described and with the other apparatus as hitherto constructed no means has been provided for aerating milk, cream, or liquid to be tempered while it is running into the drum or while the drum is under motion. In applying our invention to an apparatus of the character above described we provide an air-delivery tube 29 of smaller diameter than the interior of the sleeve 10 and pass the same through the sleeve and preferably out through a stuffing-box 30 in the outer end of the T-head 12. The inner end of the air-tube 29 preferably extends into the tempering-chamber within the drum 5 beyond the inner end of the cream-supply tube 10. The outer end of the air-supply tube 29 is provided with an extension 31, which leads to a fan 32 or other device for affording a supply of air under pressure. Preferably extending from the branch 31 is a blow-off valve 33, which will open under a back pressure which is less than that which would stop the flow of the cream or liquid to be tempered into the tempering-chamber.

With our improved aerating attachment applied as described the action is substantially as follows: The water or tempering liquid and the cream or liquid to be tempered will run into and from the drum, as already described; but the cream or liquid to be tempered as it runs from the inner end of the sleeve 10 will be thoroughly commingled with and aerated by a blast of air which is delivered by the air-tube 29 into the so-called "pasteurizing-chamber." Furthermore, even after the said chamber has been nearly filled with the cream or liquid to be tempered air may be continuously forced through the drum and through the liquid to be tempered, thus continuing the aeration of said liquid. The air blown into the drum—to wit, into the pasteurizing-chamber thereof—will of course rise to the top of the same, where it finds a ready escape out and through the vent-tube 20. By this continued circulation of air not only is the cream or other liquid thoroughly aerated, but the foul gases, which are generated under the action of pasteurizing the same, will be continuously carried off.

As is well known, cream or milk always contains more or less objectionable animal or vegetable taints or odors, and in practice we have found that unless these animal and vegetable odors and foul gases generated are continuously and rapidly carried from milk or cream which is being pasteurized they will taint it to such an extent that the milk or cream or the butter made therefrom will be of an inferior quality. Since applying our improved aerating device to the apparatus described and, in fact, to a number thereof, we have improved the quality of the butter made at our creamery to a remarkable degree and, in fact, to an extent which has been noted and highly commented upon by the trade.

What we claim, and desire to secure by Letters Patent of the United States, is as follows:

1. The combination with a rotary drum or receptacle having a liquid-supply tube extending through one of the journals thereof, of an air-vent leading outward from the inner portion of said drum, said drum, through one journal thereof, and an air-delivery tube leading into said drum, through one of said journals, substantially as described.

2. The combination with a rotary drum or receptacle having a liquid-supply tube extending through one journal thereof, and an air-vent leading outward through the other journal thereof, of an air-delivery tube leading into said drum through one journal thereof, and concentrically located with respect to said liquid-supply tube, substantially as described.

3. The combination with a rotary drum or receptacle having hollow trunnions, of a liquid-supply tube leading into said drum through one trunnion thereof and an air-vent tube leading outward through the other trunnion thereof, an air-delivery tube extending into said drum through said liquid-supply tube, and means for producing a forced circulation of air through said delivery-tube and out through said air-venting tube, said air-venting tube having its inner end raised to the upper portion of said drum, substantially as described.

In testimony whereof we affix our signatures in presence of two witnesses.

CARL SCHALLINGER.
MADS SONDERGAARD.

Witnesses:
G. H. SIONRIGHT,
WM. P. DAVIDSON.